(12) United States Patent
Hummel et al.

(10) Patent No.: US 6,325,462 B1
(45) Date of Patent: Dec. 4, 2001

(54) MOTOR VEHICLE WHEEL HAVING HOLLOW SPOKES

(75) Inventors: Frank Hummel, Eningen; Jens Stach, Heimsheim, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/206,947

(22) Filed: Dec. 8, 1998

(30) Foreign Application Priority Data

Dec. 11, 1997 (DE) ............................................. 197 54 959

(51) Int. Cl.⁷ ....................................................... B60B 1/06
(52) U.S. Cl. ................................................. 301/65; 301/66
(58) Field of Search ............................... 301/65, 66, 64.2, 301/64.7; 295/7, 8; 180/190, 193, 9.52, 9.56; 164/98, 92

(56) References Cited

U.S. PATENT DOCUMENTS

| 1,635,490 | * | 7/1927 | Meldrum ................................ 301/65 |
| 1,641,107 | * | 8/1927 | Walther .................................. 301/65 |
| 3,253,862 |   | 5/1966 | Watanabe ............................... 301/65 |
| 3,856,360 | * | 12/1974 | Lindberg et al. ....................... 301/65 |
| 3,968,996 | * | 7/1976 | Wilcox ................................. 301/64.7 |
| 4,000,926 | * | 1/1977 | Wilcox ................................. 301/64.7 |
| 4,035,028 | * | 7/1977 | Wilcox ................................... 301/63 |
| 4,252,378 | * | 2/1981 | DeBolt et al. ....................... 301/64.7 |
| 5,080,444 | * | 1/1992 | Hopkins et al. ..................... 301/64.7 |
| 5,415,464 | * | 5/1995 | Scott ...................................... 301/65 |
| 5,433,511 | * | 7/1995 | Wei ..................................... 301/64.3 |
| 5,527,101 | * | 6/1996 | Kato et al. ............................. 301/65 |
| 5,538,329 | * | 7/1996 | Stach ..................................... 301/65 |
| 5,564,793 | * | 10/1996 | Whiteford ........................... 301/64.7 |
| 5,575,539 | * | 11/1996 | Stach ..................................... 305/65 |
| 5,896,912 | * | 4/1999 | Monroe et al. ....................... 164/134 |
| 5,992,500 | * | 11/1999 | Schneider et al. ..................... 164/98 |
| 6,024,415 | * | 2/2000 | Stach ................................. 301/64.2 |

FOREIGN PATENT DOCUMENTS

| 206973 | 2/1909 | (DE) . |
| 36 42 978 C1 | 6/1988 | (DE) . |
| 3814344 | * 11/1989 | (DE) ............................... 301/64.7 |
| 41 38 558 | 5/1993 | (DE) . |
| 44 21 470 A1 | 2/1996 | (DE) . |
| 195 01 508 C1 | 4/1996 | (DE) . |
| 63203263 A | 8/1988 | (JP) . |
| 99/39923 | 8/1999 | (WO) . |

* cited by examiner

Primary Examiner—S. Joseph Morano
Assistant Examiner—Long Bao Nguyen
(74) Attorney, Agent, or Firm—Crowell & Moring, LLP

(57) ABSTRACT

A motor vehicle wheel having hollow spokes and made of a light metal is produced in a casting process. In the hollow space, the wheel spokes have a dead core consisting of a metallic material in the form of a metal foam or of a closed shell-shaped element, which dead core remains in the hollow space after casting.

3 Claims, 7 Drawing Sheets

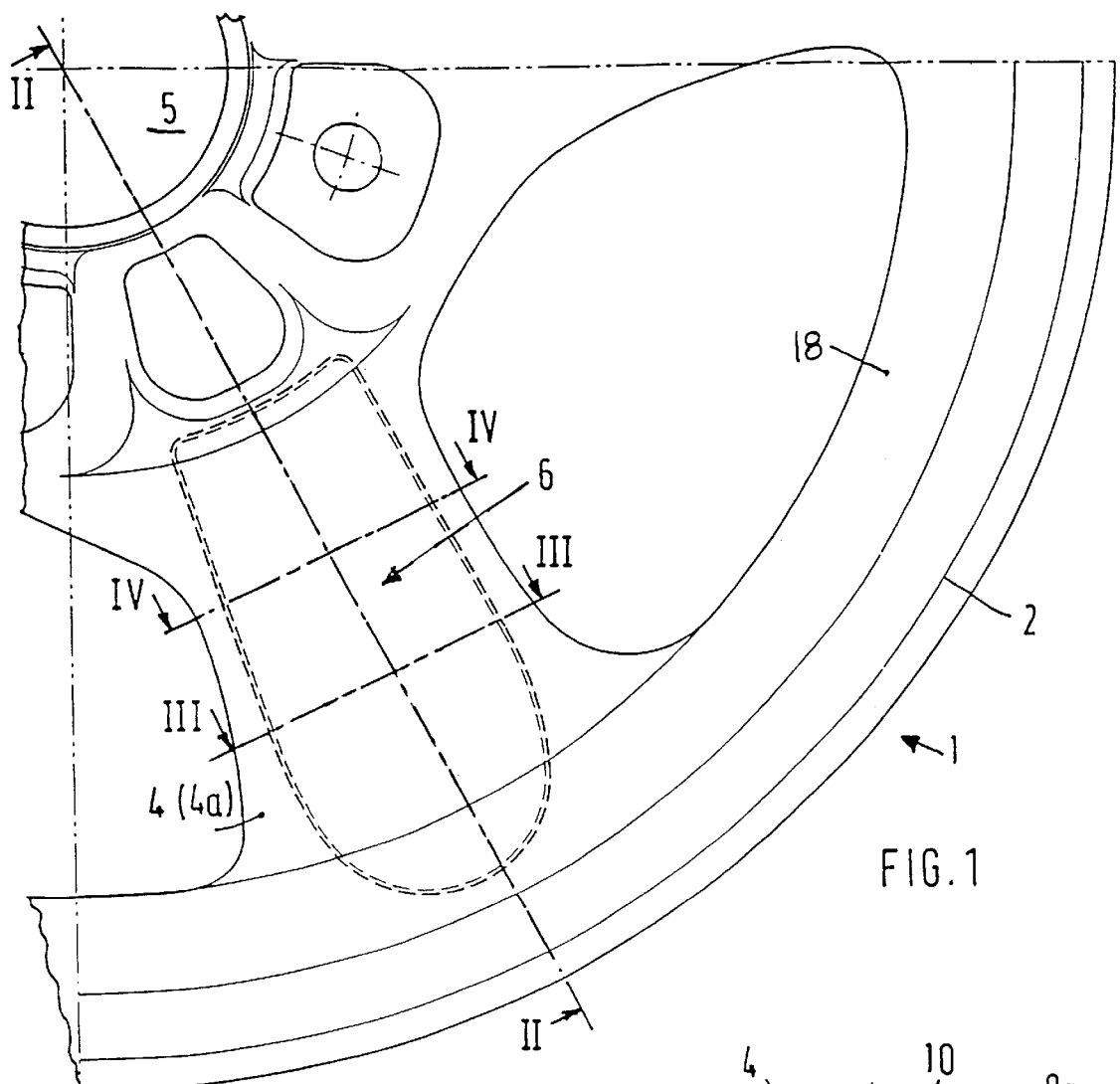
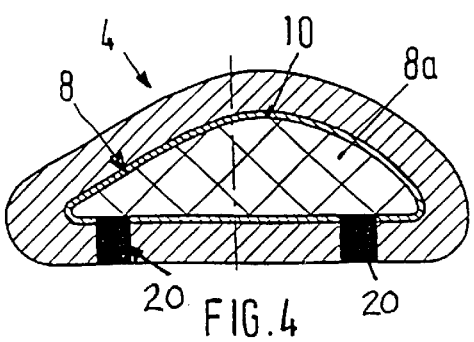
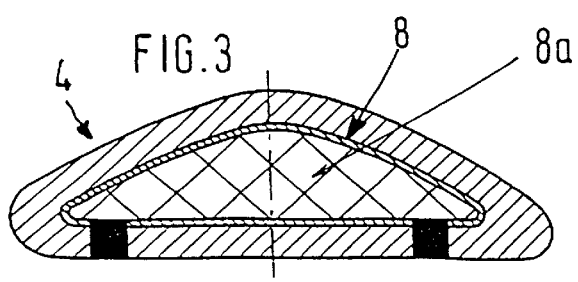

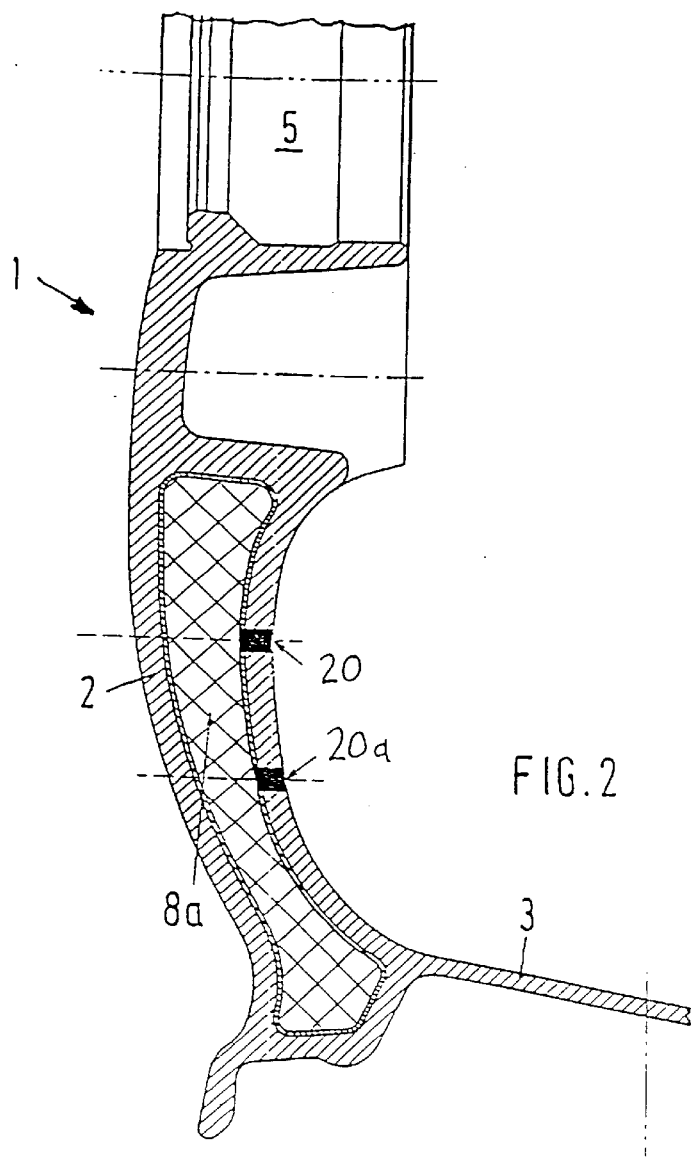
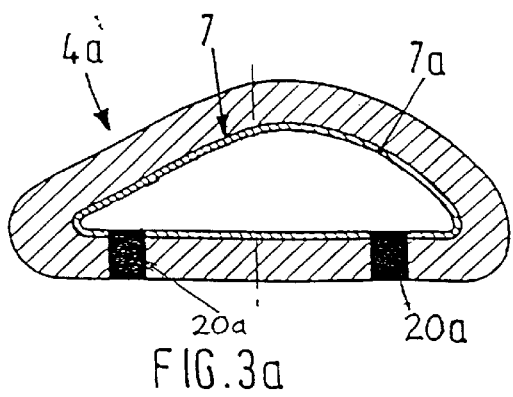
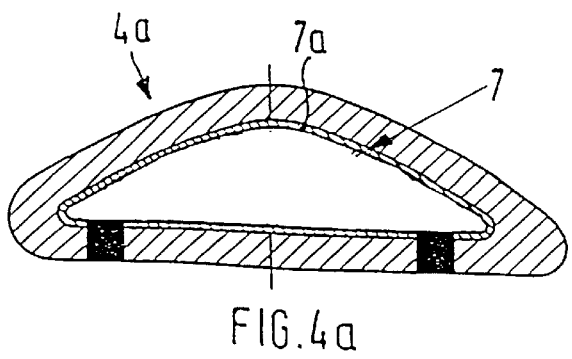
FIG.2
FIG.3a
FIG.4a

MOTOR VEHICLE WHEEL HAVING HOLLOW SPOKES

BACKGROUND AND SUGARY OF THE INVENTION

This application claims the priority of German patent 197 54 959.4, filed Dec. 11, 1997, the disclosure of which is expressly incorporated by reference herein.

The invention relates to a motor vehicle wheel having hollow spokes and more particularly to such a wheel made of light metal and producible in a casting operation.

From German Patent Document DE 44 21 470 A1, a cast vehicle wheel having hollow spokes is known which have an opening in the rim for removing a core, and the space of the wheel from which the core was removed forms a hollow space which is open toward the rim.

Furthermore, from German Patent Document DE 19 501 508, components are known for a chassis of a motor vehicle which consist of diecast aluminum and have a hollow space in which the aluminum foam is situated.

It is an object of the invention to provide a vehicle wheel having hollow spokes which can be produced in a simple manner and which has a stable construction.

This and other objects have been achieved according to the present invention by providing a motor vehicle wheel having hollow spokes made of a light metal and producible in a casting operation, each of said spokes having a dead core made of a metallic material in a hollow space, said dead core forming a closed hollow space in the spoke.

This and other objects have been achieved according to the present invention by providing a cast motor vehicle wheel, comprising: a cast rim; a cast wheel spider having a plurality of spokes; and a non-cast core located in each of said spokes, said core being unremovable from said spokes.

This and other objects have been achieved according to the present invention by providing a method of making a motor vehicle wheel, comprising: providing a casting die having die spaces defining a rim and a wheel spider having a plurality of spokes; positioning a core in each of said die spaces defining said spokes; and providing a casting material to said die spaces such that said core is embedded within said casting material, said core being unremovable from said spokes.

The principal advantages achieved by the invention are that the hollow spaces (i.e., core spaces) of the wheel spokes promote the dimensional stability of the wheel spokes via a dead core consisting either of at least one shell or a metal foam. As the resup of the dead core, a lower wall thickness of the wheel spokes can be selected, whereby the wheel as a whole becomes lighter than a wheel with unfilled hollow spaces.

The dead core must be arranged in a precise position in the casting die by way of positioning elements, such as pins, so that a dimensional precision can be achieved as with a sand core. So that any finishing is eliminated, the positioning elements consist of a light metal, like the wheel, so that an intimate connection with the spoke wall takes place during the casting process. The dead core may also be arranged in the areas between the wheel spokes in the rim.

The shell-shaped hollow elements may consist of metals, such as a light metal, for example, of an aluminum alloy or of a steel alloy; other metals also being contemplated which have a melting point above the casting temperature.

The hollow elements may also be composed of several shells and may be produced in a hydroformed manner.

The foamed core consisting, for example, of aluminum has a correspondingly treated skin. The core should have a considerably lower overall density than the casting material. Furthermore, for the space of the casting operation, the core must be resistant the temperature of the molten mass and dimensionally stable for the duration of the casting operation.

Among other advantages, the use of dead cores results in the advantage that molding sand need not be shaken out of the hollow spaces.

Various supports of the dead core are contemplated for the casting of the wheel. Thus, the dead core can be supported in the wheel hub. Furthermore, a support in the bores of the wheel bolts is contemplated. Also, a support can take place through openings in the rim. The dead core is a cohesive structure and fills all hollow spaces of the wheel, such as the spokes and the annuli.

Other objects, advantages and novel features of the present invention will become apparent from the following detailed description of the invention when considered in conjunction with the accompanying drawings.

BRIEF DESCRIPTION OF THE DRAWINGS

FIG. 1 is a partial top view of a vehicle wheel according to a preferred embodiment of the present invention having a hollow space;

FIG. 2 is sectional view according to Line II—II of FIG. 1;

FIG. 3 is a sectional view according to Line III—III of FIG. 1 with a foam filling;

FIG. 3a is a sectional view according to Line IV—IV with a shell-shaped element;

FIG. 4 is a sectional view according to Line IV—IV of the wheel spokes with a foam filling;

FIG. 4a is a sectional view according to Line III—III of FIG. 1 with a shell-shaped dead core;

DETAILED DESCRIPTION OF THE DRAWINGS

Figure 5:
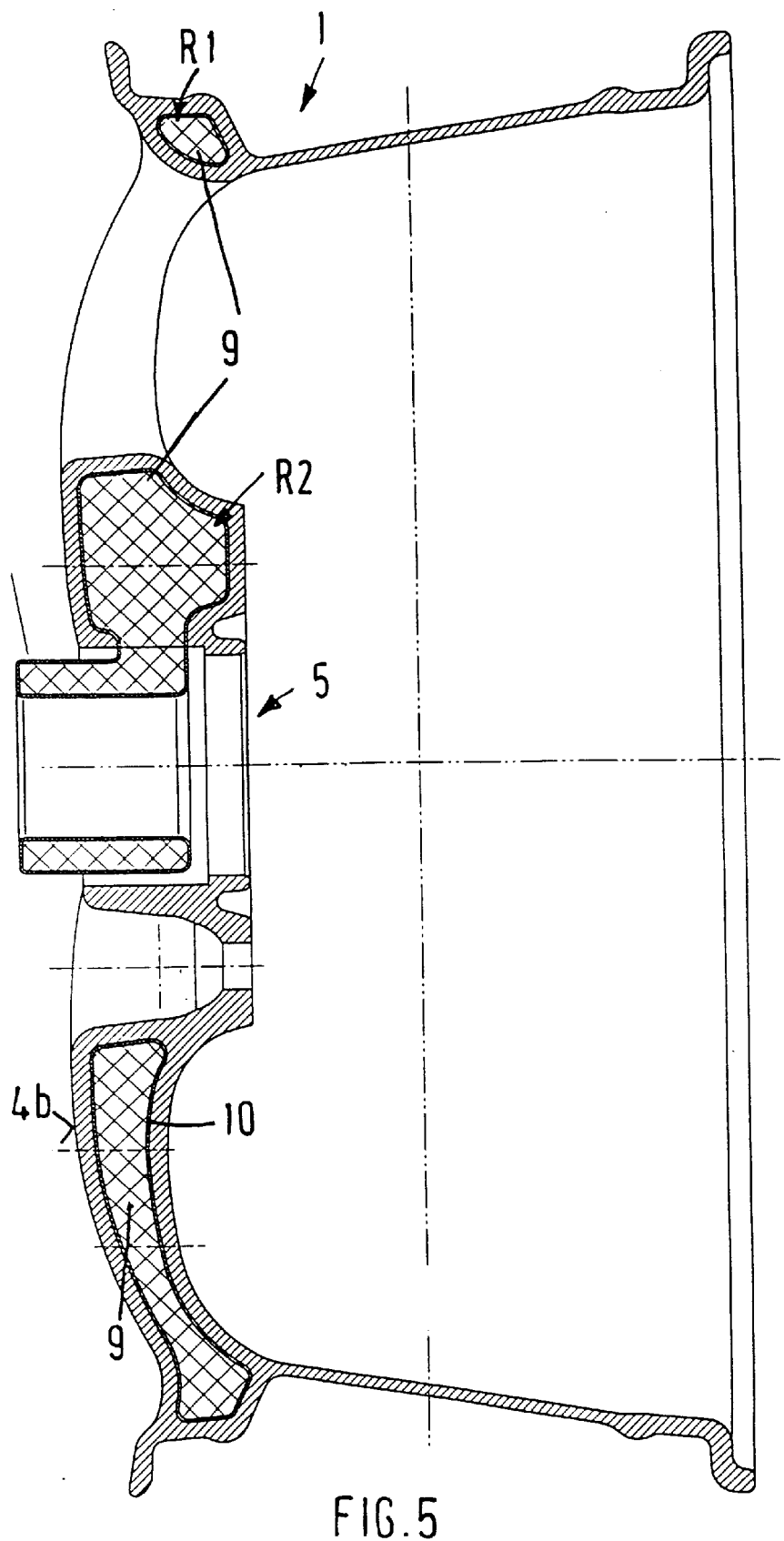
FIG. 5 is a view of a construction of a wheel with a dead cork which is supported in the area of the wheel center.
Figure 6:
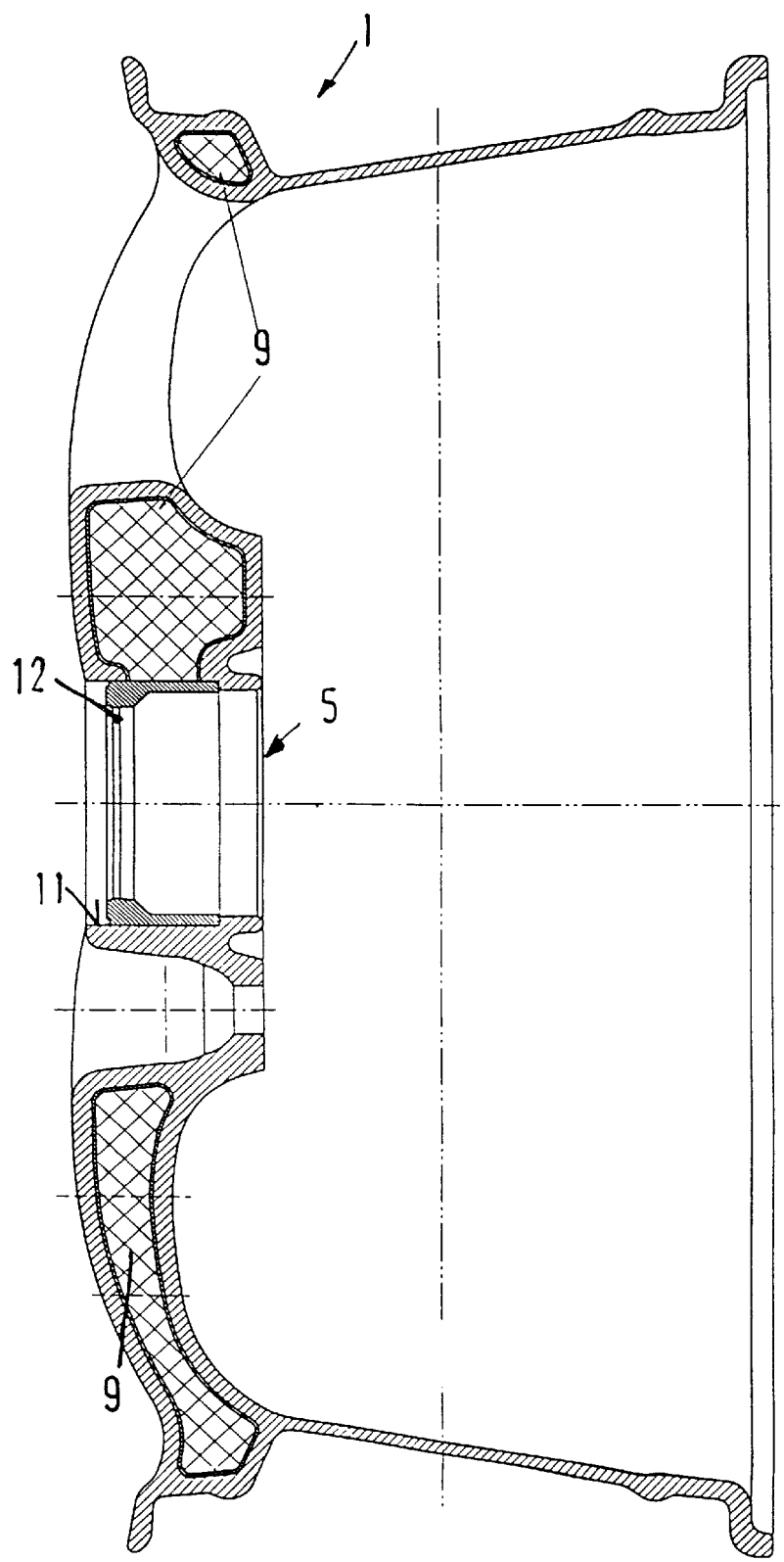
FIG. 6 is a view of the construction according to FIG. 5 after the machining and inserting of the central bush.

Referring to FIGS. 1–2, a wheel 1 for a motor vehicle comprises a rim 3 connected with a wheel spider 2. The wheel spider 2 has spokes 4, 4a which extend radially toward the rim center or hub 5.

The wheel spokes 4, 4a have a hollow space 6 which extends approximately radially from the rim center 5 to the rim 3. This hollow space 6 is generated during the casting operation in that either a shell-shaped hollow element 7 (FIGS. 3a, 4a) or a core 8 made of a metal foam (FIGS. 3 and 4) is arranged in the casting die corresponding to the number of wheel spokes 4, 4a. After the casting operation, this core 7 or 8 remains in the spokes 4, 4a as a dead core 7, 8.

For a precisely positioned arrangement in the casting die, the dead core 7, 8 has positioning elements 20, 20a which remain in the wall of the wheel spokes 4, 4a and are intimately and integrally connected therewith.

The hollow space 6 in the wheel spokes 4, 4a preferably has a closed construction so that the dead core 7, 8 causes a flat inner support.

The shell-type hollow element 7 in the spoke 4a according to FIGS. 3a and 4a consists of a shell 7a or of at least two fitted-together shells. The shells 7a may, for example, be manufactured in a hydroformed manner.

The materials for the shells may be light metals, such as an aluminum alloy or a steel alloy. A ceramic element is also contemplated.

The foamed dead core 8 in the spokes 4 according to FIG. 3 and 4 may consist of an aluminum foam 8a as well as of a ceramic foam.

The foam 8a is surrounded by a skin 10. The area 18 between the wheel spokes 4, 4a in the rim 3 may also be provided with a dead core so that partial ring sections (i.e., arcs between adjacent spokes) are formed.

The construction of the wheel spokes 4, 4a is illustrated, for example, in FIGS. 3, 3a, 4, 4a. Other cross-sections of the ribs are also contemplated, such as oval, polygonal, rectangular, square or similar geometrical shapes. Spoke shapes with circular cross-sections are also contemplated.

The other constructions of the wheels according to FIGS. 5 to 9 illustrate dead molding cores consisting of a foamed core 9, 13 and 19 which are supported in a positioned manner at different locations of the wheel and which are constructed in a projecting manner and this projecting area is supported in a casting die.

According to FIG. 5, the core 9 is led out of the wheel center 5 and is supported in the casting die. After a machining to the diameter of the bore 11, a central bush 12 is pressed in. This provides an additional sealing-off of the hollow spaces.

Figure 7:
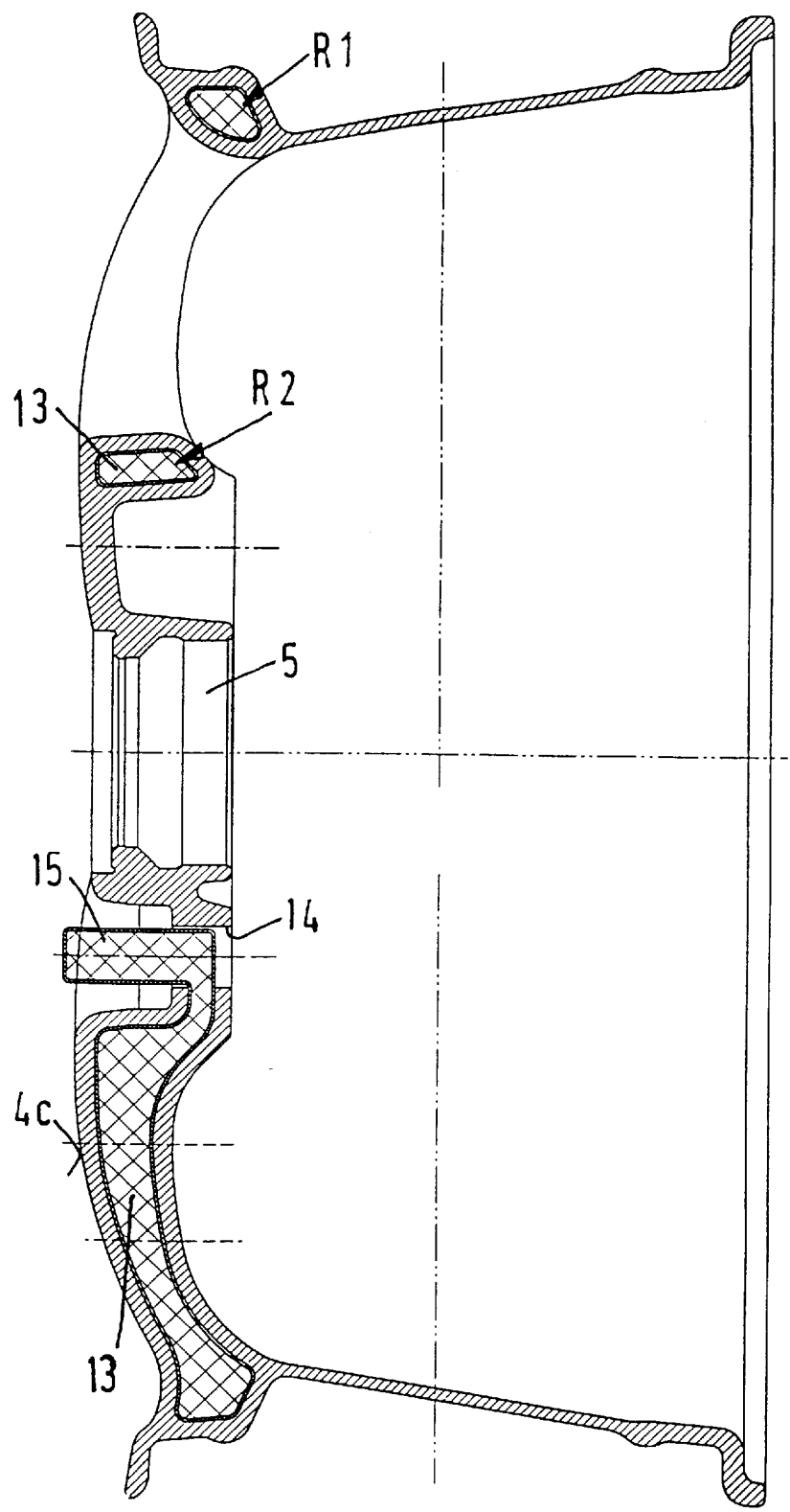
FIG. 7 is a view of another construction of a wheel with a dead core which is led out and supported in the bores for the wheel bolts.
Figure 8:
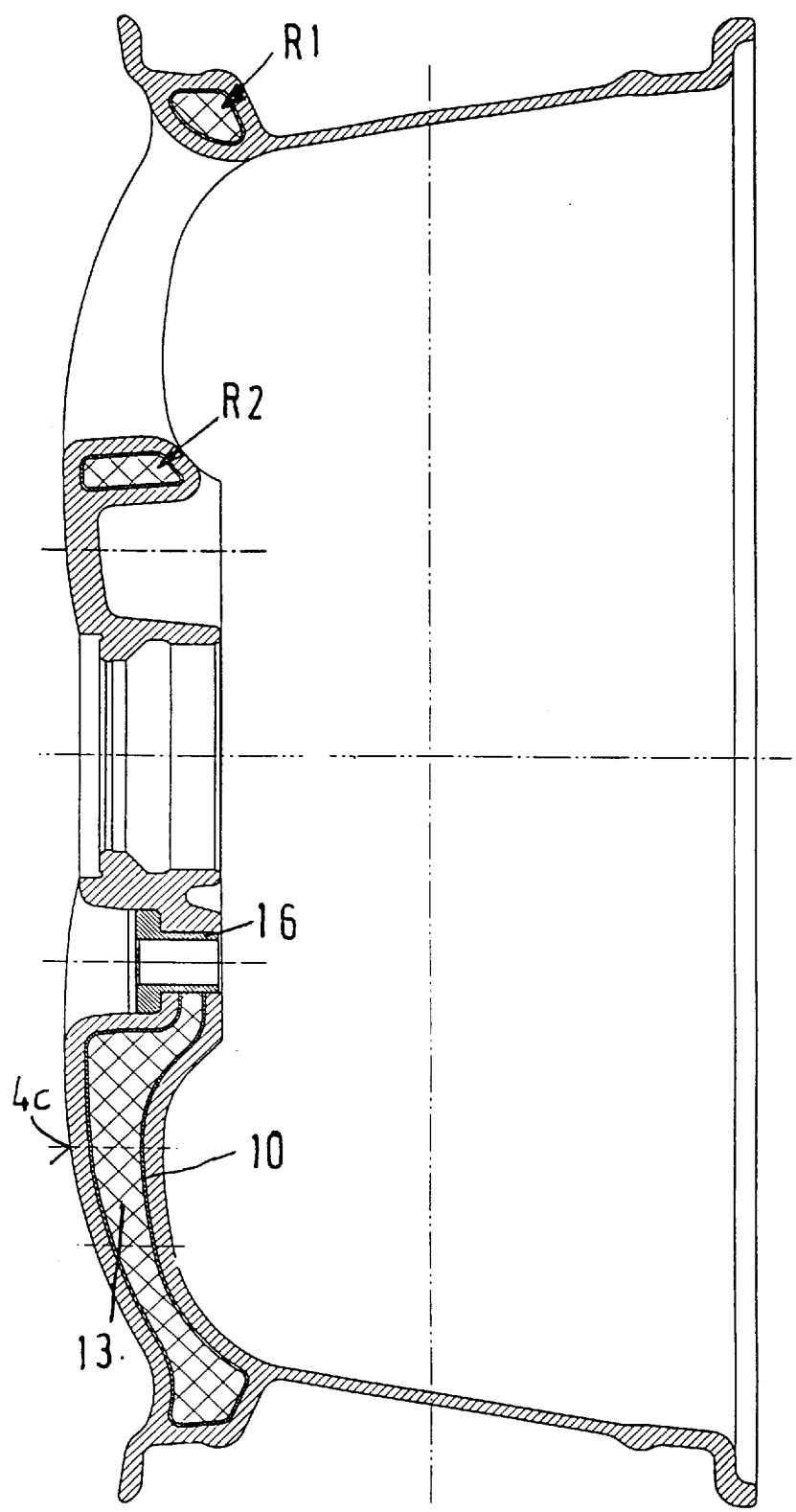
FIG. 8 is a view of the construction according to FIG. 7 after the machining with inserted bushes.

According to FIG. 7, the core 13 is led out of the bores 14 for the wheel bolts and is supported in the casting die. After machining to remove the projecting core part 15 at the diameter of the bore 14, a bush 16 is pressed in which will then receive the wheel bolts.

Figure 9:
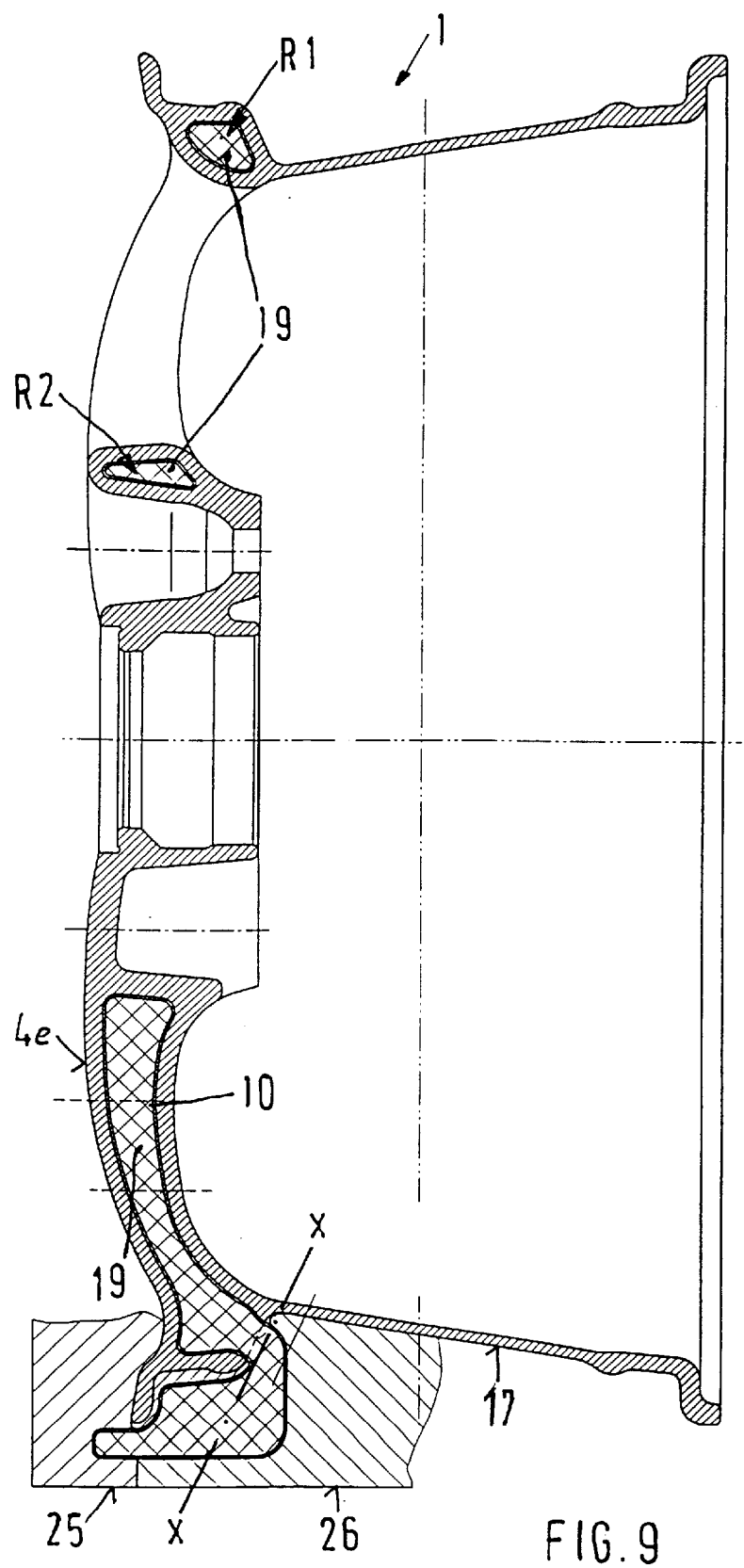
FIG. 9 is a view of another construction of a wheel with a dead core which is led out of openings of the spokes in the area of the rim and is supported.

According to FIG. 9, the dead core 19 is in each case led out of openings in hollow spokes 4e and is supported in the casting die 25, 26. Portions of the core projecting from the openings are removed by machining along Line X—X according to FIG. 9.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle wheel having hollow spokes made of a light metal and producible in a casting operation, each of said spokes having a dead core made of a metallic material in a hollow space, said dead core forming a closed space in the spoke, wherein the dead core is arranged to be positioned centrically with respect to the wheel and extends from a wheel center into the hollow space of each wheel spoke and into an annulus at a radial end of each wheel spoke, and wherein the dead core projects out of the wheel center and is mechanically machined to form a continuous bore for receiving a central bush.

2. A wheel according to claim 1, wherein the dead core comprises at least one foamed metallic element with at least one casting-resistant closed skin.

3. A wheel according to claim 2, wherein the foamed metallic element is made of an aluminum foam.

* * * * *